United States Patent
Yang et al.

(10) Patent No.: US 7,856,005 B2
(45) Date of Patent: Dec. 21, 2010

(54) IMPULSIVE NOISE SUPPRESSION SCHEME IN ORTHOGONAL FREQUENCY DIVISION MULTIPLEXING

(75) Inventors: Yen-Wen Yang, Tainan (TW); Shin-Shiuan Cheng, Tainan (TW)

(73) Assignee: Himax Technologies Limited (TW)

( * ) Notice: Subject to any disclaimer, the term of this patent is extended or adjusted under 35 U.S.C. 154(b) by 1233 days.

(21) Appl. No.: 11/422,427

(22) Filed: Jun. 6, 2006

(65) Prior Publication Data
US 2007/0280097 A1  Dec. 6, 2007

(51) Int. Cl.
*H04B 7/216* (2006.01)
*H04B 1/00* (2006.01)
*H04B 17/00* (2006.01)
*H04L 27/28* (2006.01)

(52) U.S. Cl. .............. 370/342; 370/479; 370/441; 455/63.1; 455/67.13; 455/114.2; 375/260

(58) Field of Classification Search ......... 370/203–210, 370/319–320, 335, 342–344, 441, 479; 455/500–515, 455/63.1–63.4, 67.13, 570, 114.2–115.3; 375/146–148, 229–236, 260–265, 296
See application file for complete search history.

(56) References Cited

U.S. PATENT DOCUMENTS

| 7,643,574 | B2 * | 1/2010 | Roh et al. | 375/299 |
| 2003/0086371 | A1 * | 5/2003 | Walton et al. | 370/235 |
| 2004/0086027 | A1 * | 5/2004 | Shattil | 375/146 |
| 2005/0190825 | A1 * | 9/2005 | Sedarat | 375/222 |
| 2008/0260052 | A1 * | 10/2008 | Hayashi | 375/260 |

* cited by examiner

*Primary Examiner*—Thai D Hoang
(74) *Attorney, Agent, or Firm*—Baker & McKenzie LLP

(57) ABSTRACT

This invention provides an impulsive noise suppression method in orthogonal frequency division multiplexing. The method comprises an equalization and de-mapping step for estimating a preliminary estimation of signal and a total noise estimation by utilizing ideal channel estimation, de-mapping, and pilot insertion technique on received signal; and a SNR comparison step for determining a SNR by dividing said preliminary estimation of signal and said total noise estimation and comparing said SNR with a threshold value.

11 Claims, 4 Drawing Sheets

IMPULSIVE NOISE SUPPRESSION SCHEME IN ORTHOGONAL FREQUENCY DIVISION MULTIPLEXING

BACKGROUND OF THE INVENTION

1. Field of the Invention

The present invention relates to orthogonal frequency division multiplexing (OFDM), and more particularly, to impulsive noise suppression scheme in orthogonal frequency division multiplexing.

2. Description of the Prior Art

Orthogonal Frequency Division Multiplexing (OFDM) is a multi-carrier modulation technique that can manage high degree of multi-path distortions. This technique has been used in digital audio broadcasting and has been chosen for European digital terrestrial video broadcasting.

The longer OFDM symbol duration provides an advantage because impulsive noise energy is spread among simultaneously transmitted OFDM sub-carriers. However, it has been recognized that this advantage will turn into a disadvantage if the impulsive noise energy exceeds certain threshold. Hence, Sergey V. Zhidkov proposed an algorithm for impulsive noise suppression in OFDM receivers in the paper, "Impulsive Noise Suppression in OFDM Based Communication Systems", IEEE Transactions on Consumer Electronics, Vol. 49, No. 4, November 2003.

Please refer to FIG. 1, which is a block diagram showing an impulsive noise suppression scheme 100 in OFDM proposed by Zhidkov in the above mentioned paper. In this scheme 100, the received signal R after fast Fourier transform 110 can be expressed as $$R_k = H_k S_k + W_k + U_k, k=0, 1, \ldots, N-1 \quad \text{(Equation 1)}$$

where H is the discrete Fourier transform (DFT) of channel impulse response, S is the DFT of transmitted signal, W is the DFT of AWGN (Additive White Gaussian Noise) term, and U represents the DFT of impulsive noise, respectively. By assuming ideal channel estimation $\hat{H}_k \equiv H_k$, the received signal after frequency domain equalization 120 can be expressed as $$R_k^{(eq)} = \frac{R_k}{\hat{H}_k} = S_k + \frac{W_k}{\hat{H}_k} + \frac{U_k}{\hat{H}_k}, k = 0, 1, \ldots, N-1 \quad \text{(Equation 2)}$$

The preliminary estimation of transmitted base-band symbol, $\hat{S}_k$, k=0,1, ..., N−1, is derived from the equalizer 120 output via the "de-mapping and pilot insertion" procedure 130 by setting silent sub-carriers to zero, replacing pilot sub-carriers by known values, and de-mapping data transmission sub-carriers to nearest positions in constellation plot.

Thereafter the estimation of total noise term, $D_k = W_k + U_k$, is performed according to the following equation:

$$\hat{D}_k = \hat{H}_k (R_k^{(eq)} - \hat{S}_k), k = 0, 1, \ldots, N-1 \quad \text{(Equation 3)}$$

where the total noise term D is a frequency domain representation of impulsive noise corrupted by AWGN and can be calculated by the adder 132 and the multiplier 134.

In order to reconstruct impulsive noise $\hat{U}_k$, the output vector $\hat{D}_K$ of the multiplier 134 is transformed into time domain $\hat{d}_k$ by means of IFFT 140. The variance of $\hat{d}_k$ could be estimated by the following equation:

$$\sigma^2 = \frac{1}{N} \sum_{k=0}^{N-1} |\hat{d}_k|^2 \quad \text{(Equation 4)}$$

After that, the time domain representation of impulsive noise $\hat{u}_k$ could be re-constructed by the following equation:

$$\hat{u}_k = \begin{cases} \hat{d}_k, & \text{if } |\hat{d}_k|^2 > C\sigma^2 \\ 0, & \text{otherwise} \end{cases}, k = 0, 1, \ldots, N-1 \quad \text{(Equation 5)}$$

where C is a threshold value that corresponds to small probability of false detection. Next, the frequency domain representation of impulsive noise $\hat{U}_k$ could be transformed from the time domain representation of impulsive noise $\hat{u}_k$ by means of FFT 160.

At last, the noise-suppressed signal $R_k^{(comp)}$ could be calculated by an inverting mean 170, multiplier 162, and adder 164 according to the following equation:

$$R_k^{(comp)} = R_k^{(eq)} - \frac{\hat{U}_k}{\hat{H}_k}, k = 0, 1, \ldots, N-1 \quad \text{(Equation 6)}$$

The computed received signal could be sent to a Viterbi Decoder 180 for further processing.

However, in this proposed scheme 100, the computation of impulsive noise $\hat{U}_k$ involves an inverse FFT (IFFT) operation, a peak detection operation (the Peak detector 150), and a FFT operation. These operations require a substantial amount of power. Nevertheless, the computation of $\hat{U}_k$ is necessary given the occasional existence of the impulsive noise power. Therefore, there is a need for a better scheme to omit the computation of impulsive noise when it is unnecessary.

SUMMARY OF THE INVENTION

The objects, features and advantages of the present invention will become apparent to one skilled in the art from the following description and the appended claims taken in conjunction with the accompanying drawings.

One object of this invention is to provide an impulsive noise suppression method in orthogonal frequency division multiplexing. The method comprises: (1) a fast Fourier transform (FFT) step to transform received signal; (2) a frequency domain equalization step to equalize the output of said FFT step based on ideal channel estimation; (3) a de-mapping and pilot insertion step to convert the output of said equalization step into a preliminary signal estimation of transmitted base-band symbol where the conversion is achieved by suppressing sub-carriers to zero, replacing pilot sub-carriers by known values, and de-mapping data transmission sub-carriers to nearest positions in constellation plot; (4) a noise estimation step to determine an estimation of total noise by multiplying said ideal channel estimation to the difference between the output of said equalization step and said preliminary signal estimation; and (5) a SNR (signal to noise ratio) comparison step to determine a SNR by dividing said preliminary signal estimation by said estimation of total noise and then compare said SNR to a threshold value.

One object of this invention is to provide another impulsive noise suppression method in orthogonal frequency division multiplexing. The method comprises three steps: (1) an estimation step, (2) a determination step, and (3) a suppression step. By applying ideal channel estimation and the de-mapping and pilot insertion technique on the received signal, the estimation step generates a preliminary estimation of a received signal and a total noise estimation. By dividing said preliminary estimation by said total noise estimation, a signal to noise ratio is determined in the determination step. At last, when the signal to noise ratio is less than a threshold value, the impulse noise is suppressed in the third step.

Another object of the present invention is to provide an impulsive noise suppression system in orthogonal frequency division multiplexing. The system comprises: (1) a fast Fourier transform (FFT) means to transform received signal; (2) a frequency domain equalization means to equalize the output of said FFT means based on an ideal channel estimation; (3) a de-mapping and pilot insertion means to convert the output of said equalization means to a preliminary signal estimation of transmitted base-band symbol where the conversion is performed by suppressing sub-carriers to zero, replacing pilot sub-carriers by known values, and de-mapping data transmission sub-carriers to nearest positions in constellation plot; (4) a noise estimation means to determine an estimation of total noise by multiplying said ideal channel estimation to the difference between the output of said equalization means and said preliminary signal estimation; and (5) a SNR (signal to noise ratio) comparison means to determine a SNR by dividing said preliminary signal estimation by said estimation of total noise and compare said SNR to a threshold value.

By comparing said SNR value with a given threshold, the disclosed system and methods could omit some exhaustive computations for suppressing impulsive noise. The suppression of impulsive noise may involve complicated inverse Fourier transform and Fourier transform calculations. Omitting these computation-intense means and/or steps can greatly improve the system performance and reduce computing power consumption. Moreover, performing one simple comparison is always more favorable than performing complicated Fourier transform in any implementations.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION OF THE PREFERRED EMBODIMENTS

Figure 1:
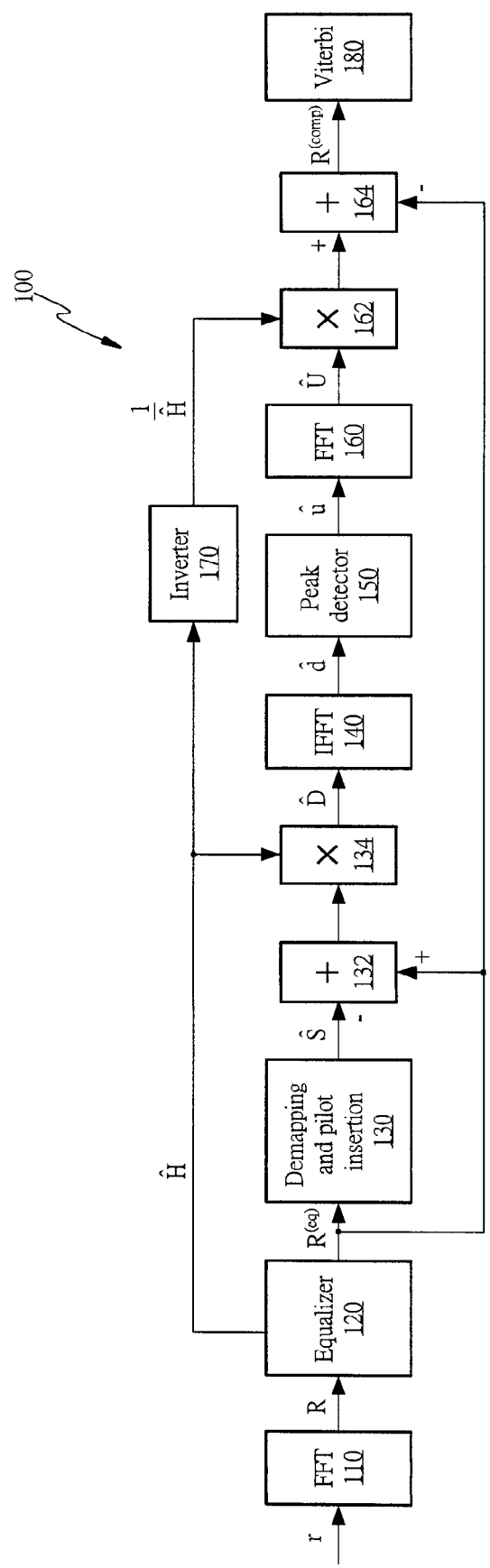
FIG. 1 is a block diagram showing an impulsive noise suppression scheme in OFDM proposed by Zhidkov.

The present invention can be described by the embodiments presented herein. It is understood, however, that the embodiments described are not necessarily limitations to the invention, but only exemplary implementations.

Having summarized various aspects of the present invention, reference will now be made in detail to the description of the invention as illustrated in the drawings. While the invention will be described in connection with these drawings, there is no intent to limit the invention to the embodiment or embodiments disclosed therein. On the contrary the intent is to cover all alternatives, modifications and equivalents included within the scope of the invention as defined by the appended claims.

It is noted that the drawings presents herein have been provided to illustrate certain features and aspects of the embodiments according to the invention. A variety of alternative embodiments and implementations may be realized consistent with the scope and spirit of the present invention.

It is also noted that the drawings presents herein are not all in scale. Some components are out of scale in order to provide a more detailed and comprehensive descriptions.

Figure 2:
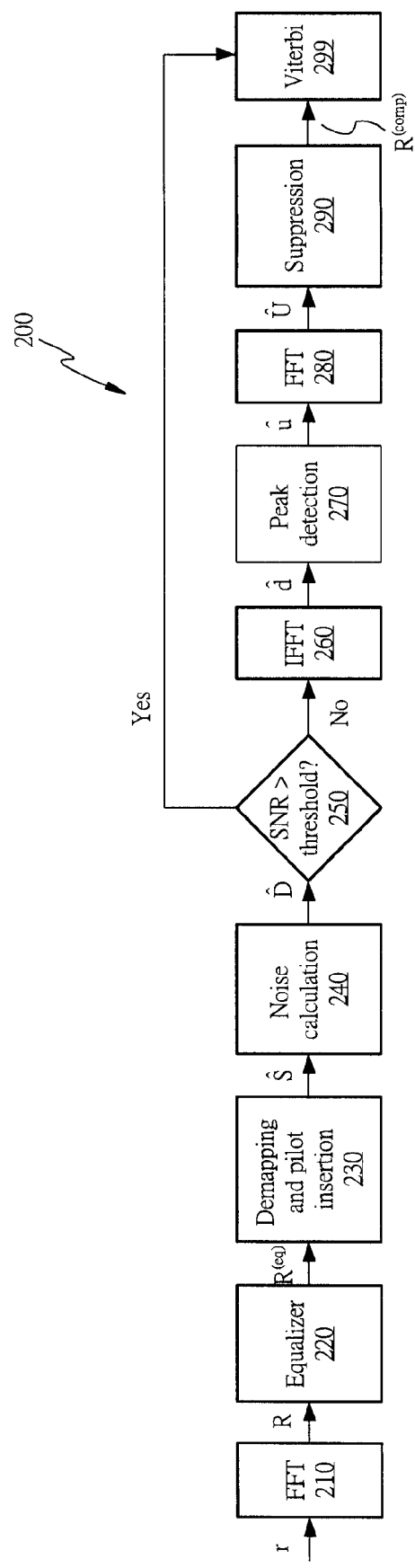
FIG. 2 is a flowchart diagram showing one embodiment of an impulsive noise suppression scheme in OFDM in accordance with the present invention

Please refer to FIG. 2, which is a flowchart diagram of one embodiment showing an impulsive noise suppression scheme 200 in OFDM. In this scheme 200, the received signal would be processed at first in a Fast Fourier Transform step 210. The output of this FFT step 210, represented as $R_k$ shown in equation 1, is sent to a frequency domain equalization step 220. In this equalization step 220, based on an ideal channel estimation ($\hat{H}_k = H_k$), the equalized received signal could be expressed as $R_k^{(eq)}$, as shown in equation 2.

Moreover, after receiving the equalized received signal $R_k^{(eq)}$, a de-mapping and pilot insertion step 230 could convert the preliminary signal estimation of transmitted base-band symbol $\hat{S}_k$ by: 1) suppressing sub-carriers to zero, 2) replacing pilot sub-carriers by known values, and 3) de-mapping data transmission sub-carriers to nearest positions in constellation plot. In other words, a preliminary signal $\hat{S}_k$ could be generated in this step 230. Thereafter, applying equation 3, an estimation of the total noise $\hat{D}_k$ could be calculated by a noise estimation/calculation step 240.

However, because impulsive noise appears occasionally, the present invention takes into account the signal to the total noise ratio. In cases where the total noise can be ignored because it is too small, steps 260 to 290 could be omitted. Since the signal $\hat{S}_k$ and the noise $\hat{D}_k$ could be determined from the de-mapping and pilot insertion step 230 and the noise estimation step 240, a SNR (Signal to Noise Ratio) value $$SNR = \hat{S}_k / \hat{D}_k$$

could be calculated and compared to a threshold value in a SNR comparison step 250. If the SNR value is greater than the threshold value, the flow would go directly to a Viterbi decoding step 299 for further processing of $R_k^{(eq)}$. On the other hand, if the SNR value is less than the desired threshold value, the next step is step 260.

As mentioned in the prior art, the total noise vector $\hat{D}_k$ is transformed into time domain $\hat{d}_k$ by an Inverse FFT step 260. Next, the time domain representation of impulsive noise $\hat{u}_k$ could be re-constructed by equations 4 and 5 in a peak detection step 270. In a next FFT step 280, the frequency domain representation of impulsive noise $\hat{U}_k$ could be transformed from the time domain representation of impulsive noise $\hat{u}_k$. Subsequently, according to equation 6, the equalized received signal $R_k^{(comp)}$ could be calculated by a noise suppression step 290 and sent to the Viterbi decoding step 299 for further processing.

Figure 3:
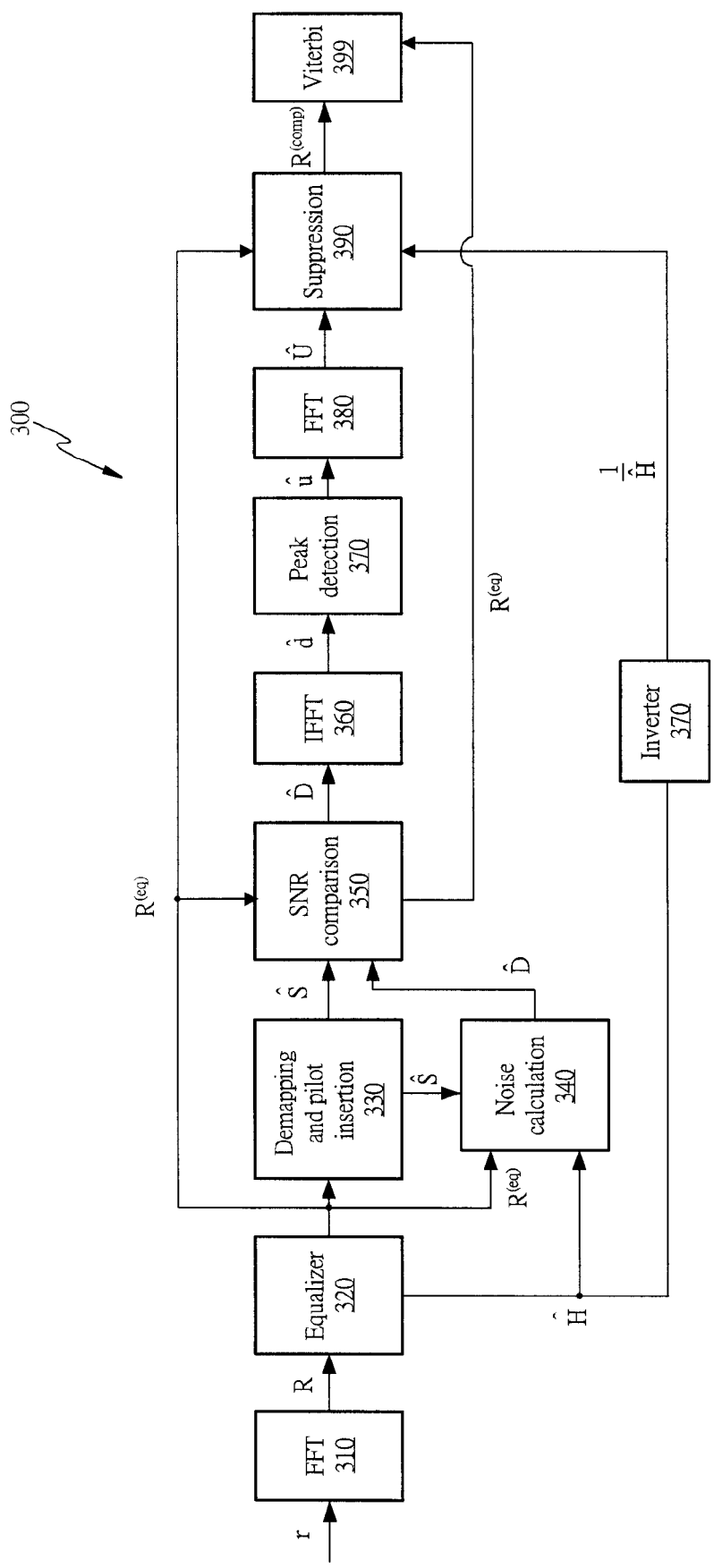
FIG. 3 is a block diagram showing another embodiment of an impulsive noise suppression system in OFDM in accordance with the present invention.

Please refer to FIG. 3, which is a block diagram that illustrates another embodiment of an impulsive noise suppression system 300 in OFDM according to the present invention. The received signal r is processed in a Fast Fourier Transform block 310 and generates $R_k$ as shown in equation 1. Taking the generated output $R_k$ of the FFT block 310 as an input to an equalizer 320, the equalizer 320 would assume ideal channel estimation ($\hat{H}_k = H_k$) and equalizes $R_k$ into $R_k^{(eq)}$. Moreover, taking the equalized received signal k as an input to the next processing block, a de-mapping and pilot insertion block 330 could convert the preliminary estimation of transmitted baseband symbol $\hat{S}_k$ by suppressing sub-carriers to zero, replacing pilot sub-carriers by known values, and de-mapping data transmission sub-carriers to nearest positions in constellation plot. Furthermore, taking the equalized received signal $R_k^{(eq)}$ and ideal channel estimation ($\hat{H}_k = H_k$) as inputs, an estimation of total noise $\hat{D}_k$ could be calculated by a noise estimation block 340 according to equation 3.

As mentioned earlier, a SNR comparison block 350 is configured to calculate the SNR, where $$SNR = \hat{S}_k / \hat{D}_k,$$

from the signal output $\hat{S}_k$ of the processing block 330 and the total noise output $\hat{D}_k$ of the processing block 340. And the SNR value is compared to a given threshold value. In the case where the SNR value is greater than the threshold value, the equalized received signal $R_k^{(eq)}$ is sent to a Viterbi decoder 399. Otherwise, the total noise $\hat{D}_k$ would be forwarded to an inverse FFT block 360 to determine the impulsive noise.

Receiving the total noise $\hat{D}_k$, the inverse FFT block 360 would transform $\hat{D}_k$ into the time domain representation of total noise $d_k$. Next, a peak detection block 370 could reconstruct the time domain representation of impulsive noise $\hat{u}_k$ according to equations 4 and 5. Taking time domain representation $\hat{u}_k$ as input, another FFT block 380 would transform it into the frequency domain representation of impulsive noise $\hat{U}_k$. Subsequently, according to equation 6, the equalized received signal $R_k^{(comp)}$ could be calculated by a noise suppression block 390 according to the received impulsive noise $\hat{U}_k$, the equalized received signal $R_k^{(eq)}$, and an inversion of the ideal channel estimation $H_k$ via an inverter 370. The equalized received signal $R_k^{(comp)}$ is then sent to the Viterbi decoder 399 for further processing.

Figure 4:
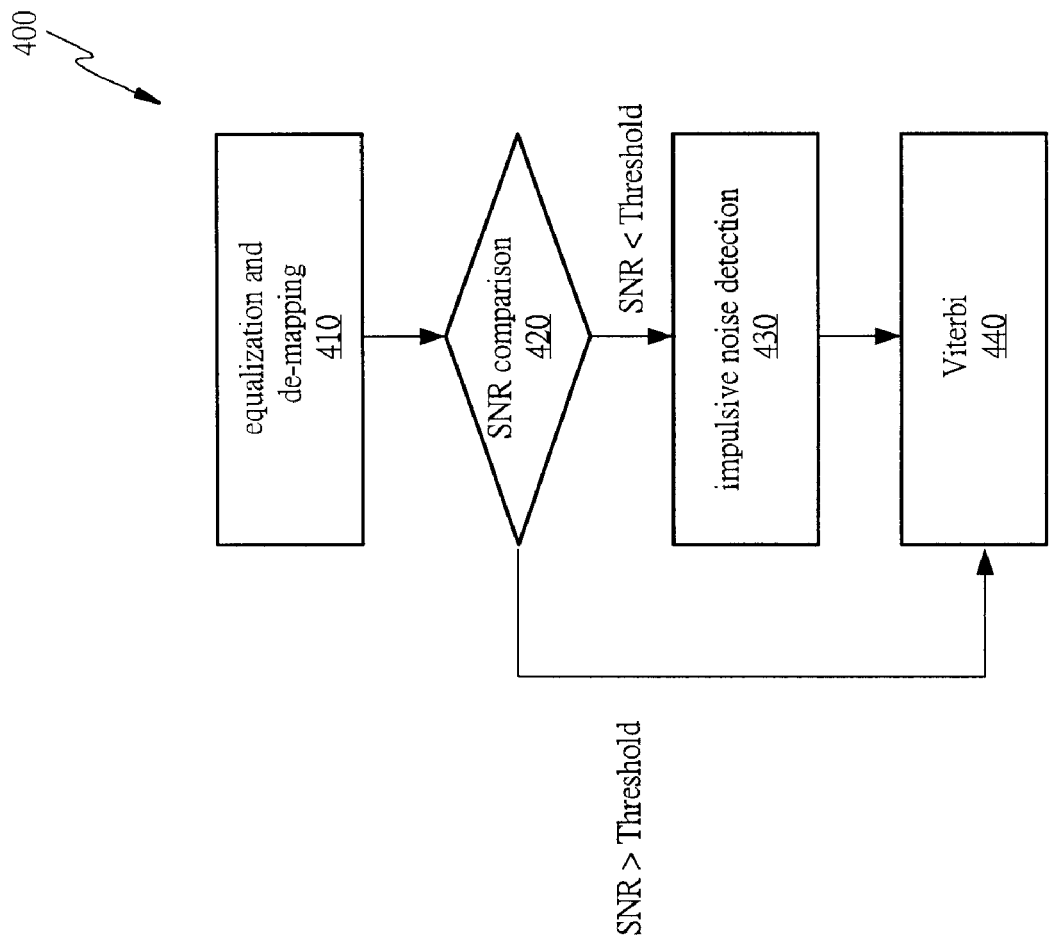
FIG. 4 is a flowchart diagram showing another embodiment of an impulsive noise suppression scheme in OFDM in accordance with the present invention.

Now please refer to FIG. 4, which is a diagram that illustrates another embodiment of an impulsive noise suppression scheme 400 in OFDM. In this scheme 400, an equalization and de-mapping step 410 is configured to have a preliminary estimation of signal and a total noise estimation by utilizing ideal channel estimation, de-mapping and pilot insertion techniques. Thereafter, a SNR comparison step 420 is performed to calculate the SNR of the preliminary estimation of signal and the total noise estimation, and to compare the calculated SNR with a desired threshold value. In the case where the SNR is greater than the threshold value, the flow goes to a Viterbi decoding step 440 for further processing. Otherwise, an impulsive noise detection step 430 would be performed to estimate the impulsive noise by utilizing variance of time domain technique.

Where the SNR is greater than the desired threshold value, the proposed method would be benefited by omitting the impulsive noise detection step 430. As mentioned, the impulsive noise detection step 430 involves IFFT, peak detection, FFT, and suppression calculations. Omitting these computation-intense steps can improve system performance and reduce computing power consumption.

It is understood that several modifications, changes, and substitutions are intended in the foregoing disclosure, and in some instances, some features of the invention will be employed without a corresponding use of other features. Accordingly, it is appropriate that the appended claims be construed broadly and in a manner consistent with the scope of the invention.

The invention claimed is:

1. An impulsive noise suppression method in orthogonal frequency division multiplexing, comprising:
   transforming a received signal into a frequency domain;
   equalizing an output of said transforming step based on an ideal channel estimation;
   converting an output of said equalizing step to a preliminary signal estimation of a transmitted base-band symbol;
   determining an estimation of total noise by multiplying said ideal channel estimation with the difference between the output of said equalizing step and said preliminary signal estimation;
   calculating a signal to noise ratio by dividing said preliminary signal estimation by said estimation of total noise;
   comparing said signal to noise ratio against a threshold value; and
   performing an impulse noise suppression step when said signal to noise ratio is lower than said threshold value.

2. The impulsive noise suppression method of claim 1, wherein said transforming step is a fast Fourier transform.

3. The impulsive noise suppression method of claim 1, wherein said converting step comprises suppressing sub-carriers to zero, replacing pilot sub-carriers by known values, and de-mapping data transmission sub-carriers to nearest positions in a constellation plot.

4. The impulsive noise suppression method of claim 1, further comprising:
   processing the output of said equalizing step through a Viterbi decoding process when said signal to noise ratio is greater than said threshold value; and
   processing the output of said impulse noise suppression step through the Viterbi decoding process when said signal to noise ratio is less than said threshold value.

5. The impulsive noise suppression method of claim 1, wherein said impulsive noise suppression step further comprising:
   transforming said estimation of total noise into a time domain representation of said estimation of total noise;
   re-constructing impulsive noise from said time domain representation of said estimation of total noise;
   transforming said impulsive noise into frequency representation; and
   calculating a noise-suppressed signal by using the difference between the output of said equalizing step and the quotient of said impulsive noise to said ideal channel estimation.

6. An impulsive noise suppression method in orthogonal frequency division multiplexing, comprising:
   based on an ideal channel estimation, equalizing a received signal in a frequency domain to obtain an equalized received signal;
   determining a preliminary signal estimation by utilizing a de-mapping and pilot insertion technique on the equalized received signal;

determining a total noise estimation by multiplying said ideal channel estimation with the difference between said equalized received signal and said preliminary signal estimation;

determining a signal to noise ratio by dividing said preliminary signal estimation by said total noise estimation;

comparing said signal to noise ratio against a threshold value; and performing an impulse noise suppression step when said signal to noise ratio is less than said threshold value.

7. The impulsive noise suppression method of claim 6, further comprising:

processing an output of an equalizing step through a Viterbi decoding process when said signal to noise ratio is greater than said threshold value; and processing an output of said impulse noise suppression step through the Viterbi decoding process when said signal to noise ratio is less than said threshold value.

8. The impulsive noise suppression method of claim 6, wherein said impulse noise suppression step further comprising:

estimating an impulsive noise when said signal to noise ratio is less than said threshold value.

9. An impulsive noise suppression system in orthogonal frequency division multiplexing, comprising:

fast Fourier transform (FFT) means to transform a received signal;

frequency domain equalization means to equalize an output of said FFT means based on an ideal channel estimation;

de-mapping and pilot insertion means to convert an output of said equalization means into a preliminary signal estimation of transmitted base-band symbol;

noise estimation means to determine an estimation of total noise by multiplying said ideal channel estimation with the difference between the output of said equalization means and said preliminary signal estimation;

SNR (signal to noise ratio) comparison means to determine a SNR by dividing said preliminary signal estimation by said estimation of total noise and comparing said SNR to a threshold value; and impulse noise suppression means to remove re-constructed impulse noise from said output of the equalization means when said SNR is lower than said threshold value.

10. The impulsive noise suppression system in orthogonal frequency division multiplexing of claim 9, comprising:

a Viterbi decoder to decode the output of said equalization means when said SNR is greater than said threshold value, and to decode the output of said impulse noise suppression means when said SNR is less than said threshold value.

11. The impulsive noise suppression system in orthogonal frequency division multiplexing of claim 9, wherein said impulsive noise suppression means further comprising:

an inverse FFT means to transform said estimation of total noise into a time domain representation of said estimation of total noise;

a peak detection means to re-construct impulsive noise from said time domain representation of said estimation of total noise;

a forward FFT means to transform said impulsive noise in time domain representation into frequency representation; and a suppression means to calculate noise-suppressed signal by using the difference between output of said equalization means and a quotient of said impulsive noise to said ideal channel estimation.

* * * * *